US006304860B1

United States Patent
Martin, Jr. et al.

(10) Patent No.: US 6,304,860 B1
(45) Date of Patent: Oct. 16, 2001

(54) AUTOMATED DEBT PAYMENT SYSTEM AND METHOD USING ATM NETWORK

(76) Inventors: Joseph B. Martin, Jr., 7500 Idylwood Rd., Falls Church, VA (US) 22043; D. Allen Hinkle, 11323 Sundial Ct., Reston, VA (US) 20194

( * ) Notice: Subject to any disclaimer, the term of this patent is extended or adjusted under 35 U.S.C. 154(b) by 0 days.

(21) Appl. No.: 08/943,284

(22) Filed: Oct. 3, 1997

(51) Int. Cl.[7] .................................................. G06F 17/60
(52) U.S. Cl. ............................................... 705/43; 705/40
(58) Field of Search ..................... 705/40, 43; 379/91.01

(56) References Cited

U.S. PATENT DOCUMENTS

| | | |
|---|---|---|
| 4,625,276 | 11/1986 | Benton et al. . |
| 4,689,478 | 8/1987 | Hale et al. . |
| 4,694,397 | 9/1987 | Grant et al. . |
| 4,823,264 | 4/1989 | Deming . |
| 4,947,028 | 8/1990 | Gorog . |
| 5,008,927 | 4/1991 | Weiss et al. . |
| 5,025,373 | 6/1991 | Keyser, Jr. et al. . |
| 5,050,207 | 9/1991 | Hitchcock . |
| 5,135,212 | 8/1992 | Utsumi et al. . |
| 5,144,115 | 9/1992 | Yoshida . |
| 5,146,066 | 9/1992 | Brun et al. . |
| 5,175,416 | 12/1992 | Mansvelt et al. . |
| 5,177,342 | 1/1993 | Adams . |
| 5,184,000 | 2/1993 | Hamada et al. . |

(List continued on next page.)

FOREIGN PATENT DOCUMENTS

WO009807119A2  2/1998  (WO) .............................. G07F/07/00

OTHER PUBLICATIONS

Autoscribe Wins Patent for Phone Payment System . . . , 1997 Dow Jones & Company, Inc., Jun. 17, 1994, p. 1–3.
The Cirrus Banking Network, David Gifford et al., Communications of the ACM, Aug. 1985, vol. 28, pp. 798–807.

(List continued on next page.)

*Primary Examiner*—Emanuel Todd Voeltz
*Assistant Examiner*—Alexander Kalinowski
(74) *Attorney, Agent, or Firm*—Marc S. Kaufman; Nixon Peabody LLP; Donald R. Studebaker.

(57) ABSTRACT

An electronic funds transfer methodology for providing access to a plurality of non-bank loan payment processors (loan servicers) through established ATM (automated teller machine) networks, thereby creating a payment system designed to allow a consumer to initiate an electronic transfer of funds from a primary bank transaction account (e.g., checking account, savings account) to a loan servicer to satisfy an outstanding consumer debt or payment obligation. Automated payment of consumer debt obligations through use of an ATM network is facilitated by a processor and associated software, which are employed to combine specific consumer loan payment data with specific depository transaction account information through an electronic ATM network for the purpose of affecting a more efficient loan payment/servicing process. Information relevant to the loan payment is electronically communicated from the loan servicer through software designed to access the servicer's loan database, extract specific fields from designated records, and communicate this information to a third party central computer. The third party central computer reformats the data as necessary, aggregates this information with any similar information received from other loan or debt servicers, and transmits the aggregated information to one or more ATM transaction processors.

9 Claims, 7 Drawing Sheets

U.S. PATENT DOCUMENTS

| | | |
|---|---|---|
| 5,189,287 | 2/1993 | Parienti . |
| 5,191,193 | 3/1993 | Le Roux . |
| 5,214,269 | 5/1993 | Yamashita et al. . |
| 5,220,157 | 6/1993 | Martin et al. . |
| 5,220,501 | 6/1993 | Lawlor et al. . |
| 5,237,159 | 8/1993 | Stephens et al. . |
| 5,245,164 | 9/1993 | Oyama . |
| 5,253,167 | 10/1993 | Yoshida et al. . |
| 5,256,862 | 10/1993 | Watanabe et al. . |
| 5,258,908 | 11/1993 | Hartheimer et al. . |
| 5,265,007 | 11/1993 | Barnhard et al. . |
| 5,265,008 | 11/1993 | Benton et al. . |
| 5,265,033 | 11/1993 | Vajk et al. . |
| 5,315,511 | 5/1994 | Matsuura et al. . |
| 5,324,922 | 6/1994 | Roberts . |
| 5,326,959 | 7/1994 | Perazza . |
| 5,326,960 | 7/1994 | Tannenbaum . |
| 5,336,870 | 8/1994 | Hughes et al. . |
| 5,350,906 | 9/1994 | Brody et al. . |
| 5,352,876 | 10/1994 | Watanabe et al. . |
| 5,412,190 | 5/1995 | Josephson et al. . |
| 5,424,938 | 6/1995 | Wagner et al. . |
| 5,434,395 | 7/1995 | Storck et al. . |
| 5,453,601 | 9/1995 | Rosen . |
| 5,455,407 | 10/1995 | Rosen . |
| 5,457,305 | 10/1995 | Akel et al. . |
| 5,468,941 | 11/1995 | Sasaki . |
| 5,473,143 | 12/1995 | Vak et al. . |
| 5,477,040 | 12/1995 | Lalonde . |
| 5,483,047 | 1/1996 | Ramachandran et al. . |
| 5,484,988 | 1/1996 | Hills et al. . |
| 5,491,325 | 2/1996 | Huang et al. . |
| 5,496,991 | 3/1996 | Delfer, III et al. . |
| 5,508,500 | 4/1996 | Martin et al. . |
| 5,532,464 | 7/1996 | Josephson et al. . |
| 5,544,043 | 8/1996 | Miki et al. . |
| 5,546,523 | 8/1996 | Gatto . |
| 5,550,358 | 8/1996 | Tait et al. . |
| 5,553,320 | 9/1996 | Matsuura et al. . |
| 5,557,087 | 9/1996 | Duyck . |
| 5,557,518 | 9/1996 | Rosen . |
| 5,559,885 | 9/1996 | Drexler et al. . |
| 5,563,393 | 10/1996 | Coutts . |
| 5,563,394 | 10/1996 | Kako et al. . |
| 5,569,897 | 10/1996 | Masuda . |
| 5,578,281 | 11/1996 | Kadowaki et al. . |
| 5,586,313 | 12/1996 | Schnittker et al. . |
| 5,591,949 | 1/1997 | Bernstein . |
| 5,593,149 | 1/1997 | Kimura et al. . |
| 5,594,225 | 1/1997 | Botuin . |
| 5,594,226 | 1/1997 | Steger . |
| 5,600,114 | 2/1997 | Dunlap et al. . |
| 5,604,341 | 2/1997 | Grossi et al. . |
| 5,649,117 * | 7/1997 | Landry .................................. 705/40 |
| 5,652,786 * | 7/1997 | Rogers .................................. 379/91.01 |
| 5,699,528 * | 12/1997 | Hogan .................................. 705/40 |
| 5,787,403 * | 7/1998 | Randle .................................. 705/43 |

OTHER PUBLICATIONS

The Impact of Technological Change on Household Transactions Account Balances: an Empirical Cross–Section Study, Kenneth Daniels et al., Journal of Financial Services Research, 1994 Kluwer Academic Publishers, pp. 113–119.

Shared ATM Networks—The Antitrust Dimension, Donald I. Baker, Federal Reserve Bank of St. Louis, Review Nov./Dec. 1995, pp. 5–17.

Payment Systems and Antitrust: Can the Opportunities For Network Competition Be Recognized, David A. Balto, Federal Reserve Bank of St. Louis, Review Nov./Dec. 1995, pp. 19–40.

Antitrust and Payment Technologies, Dennis W. Carlton et al., Federal Reserve Bank of St. Louis, Review Nov./Dec. 1995, pp. 41–54.

Is Home Banking for Real, Efrem Sigel, Datamation, 1986, pp. 128, 130 and 134.

Princeton Telecom Addresses Problems of On–Line Bill Payment, David O. Tyson, Aug. 9, 1989, American Banker, 3 pages.

Automated Bill Payments Surge, Slashing Millions from Bank Costs, Jeanne Iida, May 10, 1990, American Banker, 2 pages.

Cash on the Wirehead, Andrew Singelton, BYTE, Jun. 1995, pp. 71–78.

Online Resources' Home Banking Patent Hits Hot . . . , Feb. 17, 1994, 1997 Dow Jones & Company, Inc., pp. 1–6.

EDS' Inroads into ATMs Give Banks Pause, Source: American Banker, Jun. 29, 1995, 1997 Dow Jones & Company, Inc., pp. 1–4.

Home Banking: Checkfree Offers Bill Payment . . . , Source: American Banker, May 31, 1995, 1997 Dow Jones & Company, Inc., pp. 1–2.

Electronic Banking Goes to Market, Tekla S. Perry, IEEE Spectrum, Feb. 1988, pp. 46–49.

The Sharing of ATMS, Sherrie Shamoon, Datamation, 1984, pp. 126–130.

Easy Money, Robert M. Garsson, Datamation, 1984, pp. 37–40.

NetWorks Clash, Ken Silber, Bank Systems & Equipment, Feb. 1989, pp. 74–78.

Cirrus/Plus Link Poses New Questions For ATM Owners, Savings Institutions, Nov. 1990, pp. 8–9.

Citibank Goes Global, ABA Banking Journal, May 1991, pp. 78–80d.

ATM Competition: A Matter Of Survival, Jeanne Iida, American Banker, Sep. 4, 1991, p. 1.

ACCEL, The Exchange Merge Dramatically Increases Access To ATMs In Northwest, Business Wire, Dec. 2, 1991.

ATM Networks Mergers Seen, Los Angeles Times, Sep. 5, 1991, Business Section, Part D, p. 14, col. 2, Financial Desk.

Regional Automated Teller Systems Face Survival Struggle, The Reuter Business Report, Sep. 4, 1991.

ATM Czars Hunker Down As Competition Stiffens, Mary Beth Libbey, American Banker, Dec. 9, 1991.

Merging Cash Machines Along With The Banks, Stephen Ledford, American Banker, Dec. 9, 1991, p. 13a.

Cirrus Locater—A Voice Response ATM Directory, Jim Brown, Data Communications, May 1988, p. 13.

Commentary, James J. McAndrews, Federal Reserve Bank of St. Louis, Nov./Dec. 1995, pp. 55–59.

Commentary, Nicholas Economides, Federal Reserve Bank of St. Louis, Nov./Dec. 1995, pp. 60–63.

4 Louisville Banks say They Won't Add New ATM Fees, Kyung M. Song, Courier–Journal Louisville, Aug. 2, 1996, p. E1.

The Cash Machine, Anywhere, PC Magazine, Oct. 22, 1996, New & Improved Section, p. 76.

Banking on PCs, Edith Myers, Datamation, 1984, pp. 26–38.

Chicken and Eggs, Karen Gullo, Datamation, 1984, pp. 32–38.

A Banking Software Story, Tom Lawton, Datamation, 1985, pp. 98–102.

Is Home Banking For Real?, Efrem Sigel, Datamation, 1986, pp. 128–134.

Toward An Equitable Benchmark, Omri Serlin, Datamation, Feb. 1, 1989, pp. 47–54.

Memorandum: Electronic Funds Transfer & Mortgages, To: Sean Kidder, From: Otto Schulz, Fannie May–Washington, D.C., Nov. 5, 1991.

Financial Planner To The Masses, Evan I Schwartz, Business Week, May 20, 1991, p. 141.

Whatever happened to . . . ?, Patrick Frazer, IEEE Spectrum, May 1991, p. 18.

Prodigy Going Nationwide With Its Pay–By–PC Service, Karen Gullo, American Banker, Sep. 3, 1991.

Research Report—Market Potential For Pre–Authorized Debits, Payment Systems, Inc., Mar. 1990.

Electronic Funds Transfer: Challenges For The Computer Age, Elinor Harris Solomon, The Bankers Magazine, Jan./Feb. 1993, pp. 69–77.

Check Processing, Bank Management, Apr. 1993, pp. 23–25.

Don't Bank On It—Yet, PC Magazine, Jul. 1993, p. 105.

Ensuring Checks are Coming, But Not Soon, by Bill Orr, Cyber Banking, Technology Topics.

A New Gian Stalks the Back Office, Finance.

Electronic Banking Faces Numerous Hurdles, Byte, Dec. 1994.

ECP Brings Paperless Check Clearing Closer, Technology Topics, ABA Banking Journal, Jun. 1994, pp. 78–80.

Deliver the Goods, The Banker, Jun. 1994.

A Value Platform Analysis Perspective on Customer Access Information Technology, Decision Sciences, vol. 25, No. 5/6, pp. 767–795.

Cash on the Wirehead, by Andrew Singleton, Byte, Jun., 1995, pp. 71–78.

Customers not yet Banking on Electronic Transactions, by Mark Calvey, UMI Company, 1996.

Electric Money, by Udo Flohr, Byte, Jun. 1996, pp. 74–84.

Securing The Commercial Internet, Communications of the ACM, pp. 29–35.

Fidelity Federal Takes on Teller Machines, Computerworld, Dec. 11, 1995.

Automating In–Person Payments with Electronic Funds Transfer, Electrical World, Apr. 1989, pp. 39–40.

B of A and First Union Offering Windows–Based . . . , Dow Jones News/Retrieval, American Banker, Apr. 18, 1995, pp. 1–3.

Checkfree, Fitech Join To Market Electronic Bill . . . , Dow Jones News/Retrieval, American Banker, Apr. 17, 1995, pp. 1–2.

Fee–Based Services: Stockholder Systems . . . , Dow Jones News/Retrieval, American Banker, Nov. 18, 1993, pp. 1–2.

Autoscribe Wins Patent for Phone Payment System . . . , Dow Jones News/Retrieval, American Banker, Jun. 17, 1997, pp. 1–3.

Online Resources' Home Banking Patent Hits Hot . . . , Dow Jones News/Retrieval, American Banker, Feb. 17, 1994, pp. 1–6.

Fed Trims Rates on Some Funds Transfer Series . . . , Dow Jones News/Retrieval, American Banker, Oct. 2, 1996, pp. 1–2.

Banks Finally Awakenng to Threat Nonbanks Pose . . . , Dow Jones News/Retrieval, American Banker, Mar. 6, 1996, pp. 1–4.

EDS' Inroads into ATMs Give Banks Pause, Dow Jones News/Retrieval, American Banker, Jun. 29, 1995, pp. 1–4.

Home Banking: Checkfree Offers Bills Payment . . . , Dow Jones News/Retrieval, American Banker, May 31, 1995, pp. 1–2.

Comment: Risk Management Standards for Retail . . . , Dow Jones News/Retrieval, American Banker, May 9, 1996, pp. 1–4.

Clearing House May Do Electronic Settlement . . . , Dow Jones News/Retrieval, American Banker, Feb. 9, 1994, pp. 1–2.

N.J. Company Offering the 'Unbanked' Access To . . . , Dow Jones News/Retrieval, American Banker, Feb. 13, 1996, pp. 1–3.

Nacha Teams with Fed to Encourage Consumers to . . . , Dow Jones News/Retrieval, American Banker, Mar. 27, 1995, pp. 1–3.

EDS in Partnership for Funds Transfer Series . . . , Dow Jones News/Retrieval, American Banker, Dec. 7, 1995, pp. 1–2.

Outsourcers: Affiliated Focuses on Growing Fund . . . , Dow Jones News/Retrieval, American Banker, Apr. 26, 1995, pp. 1–2.

Chemical Ponders How to Handle PR Fallout from . . . , Dow Jones News/Retrieval, American Banker, Feb. 22, 1994, pp. 1–2.

EPS' New Chief Exec Facing Familiar Challenges . . . , Dow Jones News/Retrieval, American Banker, Sep. 16, 1993, pp. 1–2.

Comment: Regional Networks Best for Electronic . . . , Dow Jones News/Retrieval, American Banker, Jun. 29, 1993, pp. 1–3.

ATM Network Trend: In–House Data Processing . . . , Dow Jones News/Retrieval, American Banker, Mar. 10, 1993, pp. 1–3.

Wells Fargo Dropping Visa's Interlink To Join . . . , Dow Jones News/Retrieval, American Banker, Feb. 15, 1995, pp. 1–3.

Cash Station Picks EDS Switching Service Series . . . , Dow Jones News/Retrieval, American Banker, Nov. 30, 1994, pp. 1–3.

First Interstate Joins Star ATM Enhances . . . , Dow Jones News/Retrieval, American Banker, Nov. 22, 1994, pp. 1–2.

Colorado Small–Bank Trade Group Starts ATM . . . , Dow Jones News/Retrieval, American Banker, Aug. 16, 1994, pp. 1–2.

Historical Data On The Growth Of Technology Usage, pp. 1–4.

Electronic Banking Goes to Market, IEEE Spectrum, Feb. 1988, pp. 46–49.

Direct Debit Payment Picks Up Steam, Bank Management, Nov. 1993, pp. 37–38.

Supermarket EFT War Takes Shape, Chain Store Age Executive, Dec. 1993, pp. 97–98.

Welfare Plastic, Scientific American, Aug. 1994, pp. 84–86.

Marketing Debit, Progressive Grocer, Nov. 1994, pp. 79–86.

Turning Paper Check Into Plastic, Bank Marketing, Dec. 1994, pp. 15–20.

Credit and Debit Fees Hold Steady Since Price Chopper Complaint, Chain Store Age, Jan. 1996, p. 208.

Is it First and Goal For Debit Cards?, ABA Banking Journal, Sep. 1996, pp. 44–47.

Citibank Ambushed By ATM Networks, by Joyce E. Davis. No Money, Hone, Managing Change, Computerworld, Mar. 18, 1996.

Will EBT Shut Out Small Banks, ABA Banking Journal, Dec. 1995, pp. 22–23.

DoJ–EPS Settlement: Opens MAC Network, Poses Platform Obstacles, Bank System Technology, pp. 26–28.

Making Pos Debit Hapen in the Marketplace, Bank Marketing, Jul. 1994, pp. 93–102.

Jailhouse takes Away Prisoners' Cash, IBM Runs Disk Head, the Back Page, Computerworld, Aug. 14, 1995.

Debit–Card Use Growing Fast, Nation's Business, Mar. 1995.

The Changing Work of Financial Services, Nation's Business, Oct. 1994, pp. 22–29.

Supermarks: Interchange Fees Out of Line . . . , Dow Jones News/Retrieval, American Banker, Mar. 16, 1995, pp. 1–4.

Visa Service Speeds the Debiting Of Bank Account . . . , Dow Jones News/Retrieval, American Banker, Jan. 28, 1994, pp. 1–3.

Top–10 EFT Growth Hits 8% As POS Importance . . . , Dow Jones News/Retrieval, American Banker, Feb. 11, 1994, pp. 1–2.

Debit Cards Gain at Supermarkets, Gas Stations . . . , Dow Jones News/Retrieval, American Banker, Oct. 19, 1993, pp. 1–3.

ATM Network Pro Sees Supermarkers Ripe for New . . . , Dow Jones News/Retrieval, American Banker, May 25, 1995, pp. 1–2.

Electronic Payments on Rise At Groceries, Trade . . . , Dow Jones News/Retrieval, American Banker, Jul. 26, 1994, pp. 1–2.

Florida Plans EBT Pullout; Citicorp Woudl Be a . . . , Dow Jones News/Retrieval, American Banker, Jan. 29, 1996, pp. 1–2.

Card Technology: Agreements with Bank One, . . . , Dow Jones News/Retrieval, American Banker, Oct. 18, 1993, pp. 1–3.

Speaking In Codes, News in Perspective, Datamation, Dec. 1, 1984, pp. 40 & 45.

Banks, Network Providers Eye EDI, Communications Networks, Datamation, Nov. 15, 1988, pp. 77–78.

Freddie Mac Integrates X.400 and Applications . . . , Communication News, Information Access Company, Aug. 1992, pp. 69–71.

EDI Consulting, Phillips Business Information, Inc., Predicasts, a Division of Ziff Communication Co., Nov. 16, 1992, p. 65.

Lenders Use EDI to Track Insurance, ABA Banking Journal, American Bankers Association, Feb. 1993, p. 56.

Red Letter Day; Technology Innovations in the Mortgage . . . , Bankers Association of America, Information Access Company, May 1993, pp. 54–55.

Data Interchange Set For Test on Loan Sales, National Thrift News, Inc., National Mortgage News, Jun. 21, 1993, pp. 52–53.

New 'EDI/Courier' software Will Facilitate . . . , Newswire Association, Inc., PR Newswire, Mar. 24, 1994, pp. 2–3.

Data Standardization: Streamlining Acces to the . . . , Information Access Company, Bankers Association of America, Feb. 1994, pp. 7–13.

EDI Is the Wave of the Future: HUD, National Thrift News, Inc., National Mortgage News, Mar. 14, 1994, pp. 4–6.

LL18–94: Standardization of Data Formats . . . , Fannie Mae, Sep. 15, 1994, pp. 1–6.

New Guidelines for Reporting Mortgage Delinquencies, Fannie Mae, Nov. 25, 1994, pp. 1–16.

Mandatory Electronic Reporting of Laser (R) Activity, Fannie Mae, May 8, 1995, pp. 1–2.

EDI Transaction Format for Laser (R) Reporting, Fannie Mae, Jun. 14, 1996, pp. 1–9.

Mining the EDI Gold Mine Series:6, Dow Jones News/Retrieval, American Banker, Oct. 7, 1994, pp. 1–3.

Bank of Boston Offers EDI Posting Service . . . , Dow Jones News/Retrieval, American Banker, Aug. 30, 1994, pp. 1–2.

MBA Joins Agencies to Devise Electronic Mortgage . . . , League of Savings Institutions, Information Access Company, Jun. 1992, pp. 72–74.

Mortgage Bankers Leading Form Consolidation Effort, The Mortgage Marketplace, American Banker–Bond Buyer a Division of Thomas Publishing Corporation, Nov. 2, 1992, pp. 66–68.

MGIC Installs New Sattellite Info Service, National Mortgage News, National Thrift News, Inc., Aug. 23, 1993, pp. 34–35.

Secondary Market Agencies Unite In Effort To . . . , Mortgages, Sep. 24, 1993, p. 11.

Whole–Loan Book Entry: A Blueprint for the Futrue, Bankers Association of America, Information Access Company, Oct. 1993, pp. 29–31.

A Smarter Approach to Collections, Mortgage Banking, Feb. 1995, pp. 59–63.

MERS Aids Electronic Mortgage Market, Mortgage Banking, Jan. 1997, pp. 43–47.

Technology Horizons, Technology Directory, Apr. 1992, pp. 1, 32–34.

The Technology Gap; Strategic Systems . . . , Bankers Association of America, Information Access Company, Jan. 1993, pp. 57–64.

Electronic Mortgage Talk, Bankers Association of America, Information Access Company, Aug. 1993, ppp. 44–51.

Partnership Bridged with Technology, Bankers Association of America, Information Access Company, Aug. 1993, pp. 38–43.

Housing Scene: Technology Advances May Cut . . . , National Mortgage News, National Thrift News, Nov. 15, 1993, pp. 25–27.

Start Thinking Now What Your Tech Strategy Will Be, National Mortgage News, Jan. 3, 1994, pp. 17–18.

Consumer Banking: Mortgages—How can Technology . . . , The American Banker, American Banker, Inc., Jan. 3, 1994, pp. 14–15.

Mortgage Lenders Get Wired, National Mortgage News, Nov. 1993, pp. 47–48.

CLO Loan Shopping, Secondary Marketing Executive, Jan. 1991, pp. 1, 35–37.

Mortgage Lending Rechnology, Credit Union Executive, Information Access Company, Mar. 1994, pp. 9–14.

Eyes On The Future, Newsweek, May 31, 1993, pp. 39–50.

A 'Squeeze Play' Hastens The Information Highway, The Washington Post, H–1 & H–4.

Promising But Ill–Fated Optical Storage . . . , Investor's Business Daily, Apr. 20, 1993, p. 5.

Gate Technology, Data Communications, Apr. 1993, p. 69.

Windows NT: Inside and Out, Data Communications, Apr. 1993, pp. 72, 74–77.

Networking the Light Fatastic–CD–Rom's on LANs, CD–Rom Professional, Jan. 1992, pp. 30–31, 33–34, 36–37.

A Report on the Loading of MARC Format . . . , ORION/UCLA Libraries.

The Photo CD, A Revolution in Imaging, CD–Rom Professional Journal, Jan. 1992, pp. 18–20, 22–24.

Information Systems Management, Data Communications, Apr. 1993, p. 70.

Debit POS, GAN Small Regionals Lead National Chains in Acceptance of Debit Cards, Aug. 1994, pp. 72–73.

* cited by examiner

AUTOMATED DEBT PAYMENT SYSTEM AND METHOD USING ATM NETWORK

BACKGROUND OF THE PRESENT INVENTION

Numerous processes and devices exist for facilitating electronic payments. Today, virtually all domestic banking institutions offer customers the ability to conduct a limited number of electronic transactions either from an automated teller machine (ATM) located on-site at the institution, or from a remote ATM serving the institution. The remote services are made possible in part through the development of communications systems that provide for the interconnection of many clearing house or regional, national, or international electronic funds transfer (EFT) networks. These networks are specialized digital packet networks that communicate with various ATM transaction processors and service providers using standard message protocols developed by ANSI and others. A more-or-less standard, generic ATM interface has developed in the banking industry, making it relatively easy for a consumer to use any ATM on any ATM network once he has learned how to interact with this more-or-less standard interface. Of course, ATMs produced by different manufacturers may differ in key placement, number of keys, key legends, screen size, etc. However, there has been a trend toward standardization of these features so as to minimize user discomfort with using a "foreign bank" ATM.

FIG. 1 illustrates a block diagram of an existing prior art system used to process a typical ATM transaction, such as a cash withdrawal or balance inquiry, shown generally at 8. As seen in FIG. 1, the ATM transaction system includes an ATM transaction processor 14, an ATM network access device (such as an ATM terminal) 15, an ATM banking institution 16, a consumer banking institution 18 (where the ATM banking institution 16 and the consumer banking institution 18 can be one and the same), and an automated clearing house (ACH) network 20. ATM network access device 15 is connected to ATM banking institution 16 through a suitable communications path 17. ATM transaction processor 14 is connected with a host computer at ATM banking institution 16 through communications path 19, with a host computer at consumer banking institution 18 through communications path 21, and with ACH network 20 through communications path 23. As is known to those of skill in the art, appropriate information is exchanged between ATM transaction processor 14, ATM banking institution 16, consumer banking institution 18, and ACH network 20 to effect an ATM transaction.

ATM network access device 15 may be physically co-located with the ATM banking institution 16, or may be remotely located with respect thereto. In operation, ATM network access device 15 serves as an interface between a user and the ATM network to receive input from the user and to provide necessary output (and funds, when necessary) to the user. ATM network access device 15 retrieves user information from an ATM card inserted by a user to initiate an ATM transaction, and receives appropriate associated PIN information and transaction information from the user. This information is passed through communication path 17 to the ATM banking institution 16. As necessary, information is then transferred through communications path 19 to ATM transaction processor 14. ATM transaction processor 14 identifies the consumer banking institution 18 from the information retrieved from the user's ATM card, and passes the necessary transaction information entered by the user to the appropriate consumer banking institution 18 through communications path 21.

Consumer banking institution 18 verifies the user's account data and verifies that the user has sufficient funds available for the requested transaction. Consumer banking institution 18 then forwards an authorization message (either a deny transaction request message or a proceed with transaction message, for example) to the ATM transaction processor 14 through communications path 21. ATM transaction processor 14 then forwards the authorization message back to the ATM banking institution 16 through communications path 19. These messages serve to confirm that the transaction is to proceed or be prohibited. Upon receipt of the authorization message, the ATM banking institution 16 forwards the authorization to the ATM network access device 15 using communications path 17. Based on the authorization received, the ATM network access device 15 provides suitable information and funds, if requested, to the user. The user then has the option of terminating the session, or initiating another transaction, which would proceed in a similar fashion.

Once the consumer has terminated the ATM banking session, the ATM transaction processor 14 forwards a confirmation record of the completed transaction to the ATM banking institution 16 using communications path 19, and forwards an identical confirmation record to the consumer's banking institution 18 using communications path 21. ATM transaction processor 14 also forwards a record of the transaction and information to facilitate the appropriate debiting and crediting of the necessary accounts to a designated ACH network 20 through communications path 23. ACH network 20 then operates to debit (where the user has requested a withdrawal of funds, for example) the user's account at the consumer banking institution 18 using communications path 25, and to issue a credit to the ATM banking institution 16 using communications path 27. Finally, ATM transaction processor 14 creates a record of the transaction and writes that record to a back-up data and transactions log 13 for any future reference, if necessary.

Most ATMs, however, do not currently permit customers to pay bills, make debt payments or conduct other complex financial transactions, but instead typically limit the user to withdrawals, account inquiries, account transfers, and, if the ATM the user accesses is that of his own bank, deposits. There are some circumstances where ATMs have been used to conduct transactions, such as bill payment transactions, in addition to those described above. However, in the case of bill payment transactions, the consumer is usually limited to making bill payments only to certain entities specified in advance by the bank, and is required to complete a somewhat onerous registration process for establishing ATM-based bill payment authority or privileges. Other ATM terminals have been modified to accept almost any bill payment from consumers. In such instances, the ATM functions more like a mail box: the consumer initiates a bill payment, keys in the amount to be paid, and places the payment coupon and the payment amount, either as cash or a check, into an envelope and "deposits" the bill payment into the ATM. In both of the scenarios described above, the bank assumes the role of a payment processor, separating and forwarding consumer bill payments by vendor. Neither payment methodology involves an electronic funds transfer, and neither the bank nor the vendor realizes any noticeable improvement in processing efficiency.

While personal banking and home banking initiatives have become more prolific in the past several years, the costs associated with such efforts, both for the bank and the consumer, have proven prohibitive. Service providers incur very high communications costs in linking their central processors with personal computer (PC) users, banks, and payees (merchants). Many payees also do not accept electronic payments (for lack of substantial volume), forcing service providers to make costly paper-based payments. Settlement processing can be costly, as banks must install special purpose software and operating procedures. These and other costs have been passed along to consumers, thereby dampening the demand for home banking services.

These limitations are reflected in U.S. Pat. No. 5,220,501, Lawlor et al. The process for an electronic monetary system as described by Rosen in U.S. Pat. No. 5,453,601 addresses some of the problems associated with certain payees not accepting electronic payments, but the described invention has not yet been widely implemented, if at all. In addition, many banks have developed PC and telephone banking processes merely to allow the consumer to create a paper check at the bank through a PC or telephone. The bank then processes the check in the same manner as consumer-written checks. While the consumer has not had to physically write a check, the bank must remit the paper payment created by the consumer, with little or no operational savings or efficiencies to the bank.

The effort to provide more home banking services has prompted a number of inventions that provide access to accounts through various modifications of pre-existing hardware that dial into payment networks or bank systems for processing transactions. These are described in U.S. Pat. Nos. 5,025,373; 5,591,949; 5,424,938; 5,050,297; 5,336,870. Virtually all of these inventions only increase the accessibility of the existing ATM/banking process without addressing the functionality of accessing and processing loan and other debt payments serviced by non-depositories.

Another similar approach that has met limited success has been the establishment of automatic drafting mechanisms for payment of specific consumer obligations. In this scenario, the consumer provides the vendor with information regarding his bank's automated clearing house (ACH) routing number and his account number. The vendor then drafts the amount owed, usually according to a set schedule, from the consumer's account each month. The process is efficient for the vendor and for the bank, but leaves the consumer with little control as to the timing of the draft and the amount of the draft. It is not until the draft has already occurred that the consumer is aware of the transaction, and thus able to verify the transaction's accuracy. Nor does the consumer receive a record of the transaction until the bank issues a periodic statement of the account. This is the type of invention described by Duval, et al. in U.S. Pat. No. 5,469,991, a pre-authorized billing system.

Finally, point-of-sale (POS) transactions are growing more prevalent, with ATM card readers and key pads appearing in grocery stores, convenience stores and gas stations, among others. While the predominant use of the POS terminals has been to speed the check-out time (increase payment efficiency), POS debit transactions have also provided a substitution for cash and have served to reduce the number of checks returned to the vendor due to insufficient consumer funds balances. During a POS transaction, the consumer swipes the ATM (or debit) card through a card reader. Assuming an on-line debit transaction (versus an off-line credit-oriented transaction), the consumer enters a unique personal identification number (PIN), and then waits for the card reader/register to communicate to the transactions processor the total amount of the sale (i.e., the amount to be debited from the consumer's transaction account). (In U.S. Pat. No. 5,484,988, Delfer describes a similar process that scans a consumer's account information from a physical paper check presented at the point-of-sale.) After receiving verification from the consumer's bank that sufficient funds exist in the consumer's account to cover the transaction and an authorization from the consumer's bank to proceed, the transactions processor forwards to the POS terminal a transaction approval message (or, in the case of insufficient funds, a denial). Funds are routed from the consumer's bank account to the vendor through an ACH network. This scenario provides efficiencies for the vendor, the bank, and the consumer, but unfortunately requires a purchase transaction to initiate the process. Such a requirement is unrealistic for the repayment of a loan or other debt obligation.

SUMMARY OF THE INVENTION

In view of the foregoing, it is an object of the present invention to provide a system and method for automated debt payment through the use of ACH debiting and crediting of various payor and payee accounts.

It is yet another object of the present invention to provide a system and method for automated debt payment wherein individual consumer debt payments (i.e., debits) can, if necessary depending on the type of debt, be automatically divided among (i.e., credited to) a plurality of payee accounts.

It is a still further object of the present invention to provide a system and method for automated debt payment that uses an established ATM network to receive information from a consumer identifying a type of debt payment to make and, if he wishes to pay more than the minimum amount due, an amount to pay.

It is a still further object of the present invention to provide a system and method for automated debt payment that interfaces between existing ATM networks and debt servicer systems to facilitate the payment of debt obligations by a consumer through the use of the ATM network.

It is yet another object of the present invention to provide a system and method for automated debt payment that operates to convert debt information between formats used by various debt servicers and a format used by an ATM network.

It is also an object of the present invention to reduce payment processing costs for debt servicers, such as loan servicers (e.g., mortgage, auto and home equity loan servicers), other monthly consumer debt and bill payment processors (e.g., credit card companies, public utilities, and phone and cable companies), and time payment processors (e.g. leasing and rental companies) through the use of ACH debiting and crediting of various payee and payor accounts involved, including those accounts into which segregated portions of the consumer payment must be deposited.

It is yet another object of the present invention to provide a system and method for automated debt payment that reminds a user of an ATM, during an ATM banking session, that a loan or debt payment is due or past due, thereby prompting the consumer to transact the payment of that loan or debt obligation at that time.

Yet a further object of the present invention is to make the debt payment process easier and less costly for the consumer by eliminating the need for the consumer to write a check, keep track of payment coupons or monthly statements, and to eliminate postage costs and any uncertainty related to items being lost in the mail.

An additional object of the present invention is to ensure that consumer payments are made in amounts acceptable to the loan servicer, thereby eliminating uncertainties with respect to consumer intent that occurs when payments are submitted for amounts other than that which the debt servicer is expecting.

A further object of the present invention is to facilitate the payment of consumer debt obligations where the amount of the obligation due each month is not a perpetually fixed amount.

It is also an object of the present invention to provide a system and method for automated debt payment wherein debt obligation information (i.e., minimum payment amount due, due date) is periodically updated from debt servicers records.

Yet another object of the present invention is to facilitate the payment of past due consumer debt obligations, where such obligations may be subject to a penalty charge, thereby affecting (or increasing) the minimum payment amount due.

Another object of the invention is to eliminate costs for the servicer and the consumer related to returned items (i.e., items returned for insufficient funds).

A still further object of the invention is to provide the consumer with direct and timely access to loan balance and payment information without having to contact the loan servicer.

Yet another object of the invention is to integrate, via batch processing, or make available, via a communications connection such as a modem connection, non-depository (i.e., non-bank) controlled consumer loan, debt and other obligation payment data to depository-controlled ATM transaction networks.

A further object of the invention is to facilitate any reconciling and reporting that the loan servicer must perform by reducing human intervention in those processes and therefore reducing human error.

These and other objects are achieved by the present invention, which provides an automated debt payment system and method for providing access to a plurality of non-bank loan payment processors (loan servicers) through established ATM networks, thereby creating a payment system designed to allow a consumer to initiate an electronic transfer of funds from a primary bank transaction account (e.g., checking account, savings account) to a loan servicer to satisfy an outstanding consumer debt or payment obligation. The present invention provides a system and method to facilitate automated payment of consumer debt obligations through the use of an ATM network, wherein a transactions processor and proprietary software are employed to combine specific consumer loan payment data with specific depository transaction account information for the purpose of effecting a more efficient loan payment/servicing process. Information relevant to the loan payment is electronically communicated from the loan servicer through software designed to interact with the servicer's loan database, extract specific fields from designated records, and communicate this information to a third party loan payment facilitator's central computer. The third party loan payment facilitator's central computer reformats the data as necessary, appends this information with any similar information received from other loan or debt servicers, and transmits the appended information to one or more ATM transaction processors.

All loan servicer data will be subject to standardization, since data received from loan servicers by the 3rd party central computer will consist of multiple file and field layouts and descriptions. Once all data has been received from contracting loan servicers, the central computer will translate each loan servicer's data into a common, standard format complying with ANSI X.9, ANSI X.12, ISO 8583 or other suitable standards as adopted by the financial services and ATM transactions processing industries. Once converted, standardized records files will be appended. Standardized records will be available to ATM transaction processors either in batch transmittal or on-line mode during consumer ATM transactions. Batch transmittal will require the processor to temporarily store (i.e., update daily) loan servicer records internally in database format either as a part of or separate from other consumer depository account records. Processors not wishing to store loan servicer records on-site will be able to access the central computer via standard communications paths, such as a dial-up modem connection, lease line, or TCP/IP, during any on-line consumer ATM transaction. Either access method will provide the ATM transaction processor access to the consumer's loan or debt payment obligations during any consumer-initiated ATM transaction, thereby allowing the processor to facilitate the consumer's payment request or to prompt the consumer to make a debt payment based upon dictated transaction precedence logic.

In accordance with the present invention, an ATM banking institution modifies existing ATM screens to allow for loan payment, but is otherwise not involved in the process of allowing the consumer to access the loan payment process nor in restricting the institutions whose obligations would be paid through the ATM network. In addition, the present invention fully incorporates electronic funds transfers through EFT and ACH networks, thus offering loan servicers and payment processors opportunities for significant improvements in processing efficiency.

Where specific loan investors require that the finds from their loans be kept separate and apart from loans processed by the servicer for other investors, the present invention provides for ACH debiting and crediting of the various payee and payor accounts involved, including those accounts into which segregated portions of the consumer payment must be deposited. To illustrate, in the case of mortgage loans, a single loan servicer might process monthly mortgage payments for loans owned by Fannie Mae, Freddie Mac, Ginnie Mae, the Federal Housing Administration, and other private investors. Payments received on Fannie Mae loans must be deposited to an account separate from payments received on any other non-Fannie Mae loans. Additionally, the principal and interest portion of the mortgage payment must be deposited to an account separate from the real estate taxes, hazard insurance and mortgage insurance premium portions of the payment. In all, a single consumer check received by a mortgage loan servicer as a monthly mortgage payment may first have to be deposited to one account, and the representative dollar amount later divided, separated and deposited to three or more separate accounts. Similarly, a credit card servicer might process monthly consumer credit card payments for several credit card issuers. Again, payments received for the accounts of separate card issuers must be deposited separately and apart from payments received for the accounts of other card issuers. Through the use of ACH debiting and crediting, and particularly through the issuance of multiple ACH credits to effect the transfer of funds to multiple different accounts, payment processing costs are reduced for loan and debt servicers.

In accordance with this feature of the present invention, the complexities of segregating consumer payments into separate depository (i.e., custodial) accounts is reduced. Upon consumer initiation of a debt payment via an ATM terminal, the ATM transactions processor will retrieve the consumer's debt payment data. This data will include such information as the total dollar amount of the payment due, the identity of the payee, the payee's ACH routing number, and the appropriate account number of the bank account to which the consumer's payment is to be deposited (i.e., electronically transferred). For transactions such as mortgage payments, the payment data retrieved by the ATM transactions processor will further include the subtotal amounts of the consumer's payment representing the principal and interest portion, the real estate tax portion, the insurance portion, etc., as well as the separate depository account numbers into which those subtotal amounts are to be electronically transferred. From the consumer's perspective, his transaction account will be debited for a single dollar amount. However, during the actual electronic transfer of funds from the consumer's account to the payee, that single debit amount will be further divided and routed to separate depository accounts by the issuance of multiple ACH credits.

This feature (i.e., that of electronically segregating the payment debit into multiple depository credits) marks a significant improvement over existing automatic drafting and debit payment processes. Consumer payments that do not require segregation into separate custodial accounts (i.e., monthly utility payments) will be facilitated through the issuance of a single ACH debit and a single ACH credit, thereby transferring the payment amount from the consujmer's transaction account and depositing that full payment amount into one designated depository account.

In accordance with the present invention, a messaging (or reminder) prompt is provided to consumers during ATM transactions, indicating that a loan or debt payment is due or past due, thereby prompting the consumer to transact the payment of that debt or loan obligation at that time. Messaging prompts are date sensitive, based upon a logical comparison of the current day's date to the payment due date recorded in the consumer's loan payment record available to the ATM transaction processor through a 3rd party debt payment facilitator. In the context of current ATM transaction protocols, this feature is also unique to the present invention. While serving as a reminder function for the consumer, this feature offers the loan servicer the ability to eliminate the mailing of monthly payment reminders and/or past due notices.

The present invention also eliminates the need for the consumer to write a check, keep track of payment coupons or monthly statements, and will eliminate postage costs and any uncertainty related to items being lost in the mail. In this manner, the present invention makes the payment process easier and less costly for the consumer.

The present invention also operates to ensure that consumer payments are made in amounts acceptable to the loan servicer, thereby eliminating uncertainties with respect to consumer intent that occurs now when payments are submitted for amounts other than that which the servicer is expecting. The invention will not allow the consumer to remit a payment amount less than the minimum payment due as displayed on the ATM screen to the consumer. Any dollar amounts remitted by the consumer, via the invention, in excess of the minimum payment due are automatically applied to debt principal reduction. Furthermore, since consumers will only be able to remit payments electronically via an ATM when there are sufficient funds in the designated transaction account to cover the payment, costs for the servicer and the consumer related to returned items (i.e., non-sufficient funds) will be eliminated.

The present invention also facilitates the payment of consumer debt obligations where the amount of the obligation due each month is not a perpetually fixed amount. Utility bills vary from one month to the next. The minimum payment due, and the actual amount paid by consumers, on most credit and/or charge cards also typically varies from one month to the next. Mortgage loan payments can change due to the imposition of adjustable interest rates. The present intention is designed to receive updated payment information from loan and debt servicers on a daily basis, thus ensuring that the minimum payment amount due as displayed to the consumer on the ATM screen complies with the payment terms required by the respective loan servicer.

The present invention further operates to facilitate the payment of past due consumer debt obligations, where such obligations may be subject to a penalty charge, thereby affecting (or increasing) the minimum payment amount due. For example, a payment due today may be subject to a late charge if received tomorrow, thereby increasing the amount of the obligation due if the payment is transacted by the consumer tomorrow. Again, because the present invention receives updated payment information from loan and debt servicers on a daily basis, the minimum payment amount due as displayed to the consumer on the ATM screen will always comply with the payment terms required by the respective loan servicer.

The invention also operates to provide the consumer with direct and timely access to loan balance and payment information without having to contact the loan servicer. The consumer will automatically receive a receipt of any payment transaction executed, with relevant loan balance and payment information printed thereon, and will also be able to request this information through the ATM at times other than when making a payment.

DETAILED DESCRIPTION OF THE PREFERRED EMBODIMENTS

Figure 1:
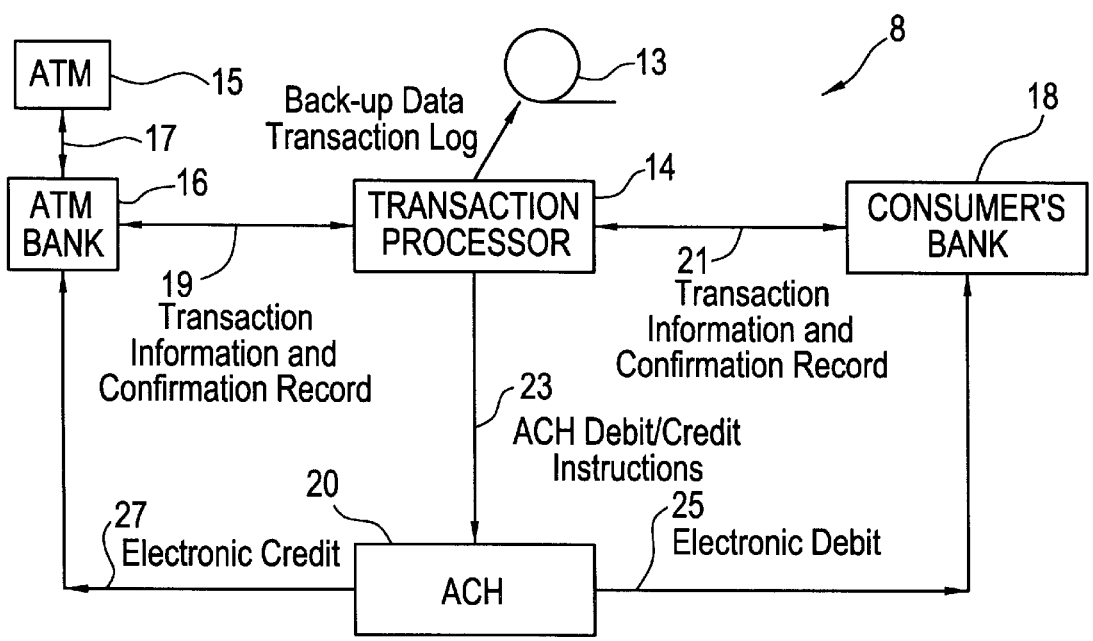
FIG. 1 shows a block diagram of a conventional ATM system illustrating the transactions that occur during a typical ATM transaction.
Figure 2:
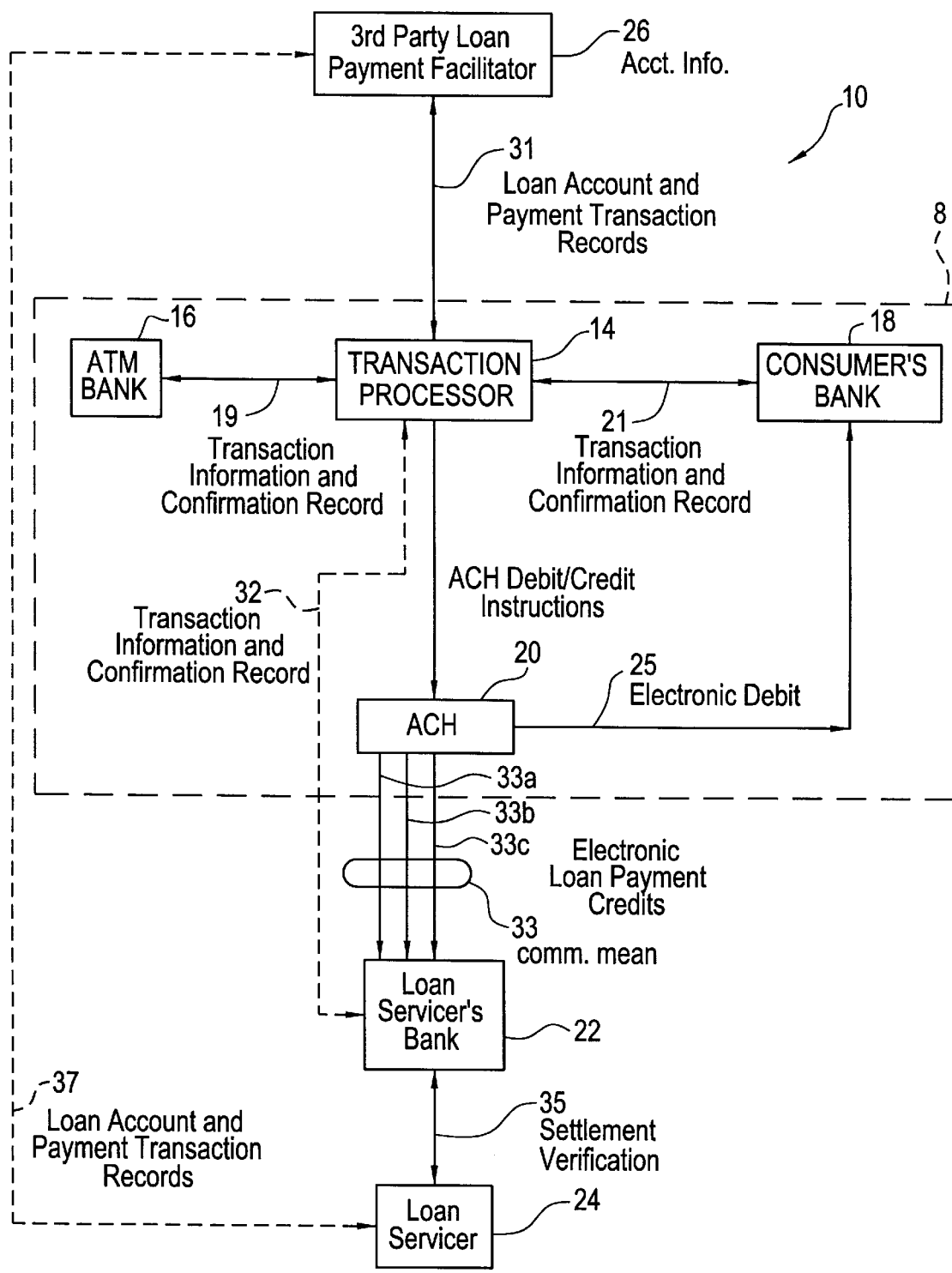
FIG. 2 shows a block diagram of the present invention illustrating the transactions that occur during the payment of a debt obligation in accordance with the present invention.

Referring now to FIG. 2, a block diagram illustrating the overall organizational structure of a system for automated debt payment in accordance with the present invention is shown generally at 10. As seen in FIG. 2, the debt payment system of the present invention includes ATM network 8 shown in more detail in FIG. 1, together with a loan or debt servicer's bank 22, a loan or debt servicer 24, and a 3rd party loan payment facilitator 26. In the present application, the term "financial institution" is used broadly to refer to either depositories or debt servicers, including either loan servicer's bank 22, loan servicer 24, or a combination of these two in a single entity.

As described above in connection with FIG. 1, ATM network 8 includes an ATM transaction processor 14, an ATM banking institution 16, a consumer banking institution 18, and an ACH network 20. In order to clarify the operation of the present invention, ATM network access device 15, communications path 17, back-up data and transactions log 13, and communications path 27 are omitted from ATM network 8 as shown in FIG. 2, but these components would typically remain present to handle typical known ATM transactions as described in connection with FIG. 1 above.

3rd party loan payment facilitator 26 is connected with ATM transaction processor 14 of the ATM network 8 through communications path 31. Furthermore, the loan or debt servicer's bank may be connected with ATM transaction processor 14 of the ATM network 8 through communications path 32. While this connection is not required, it can be used to provide communication of transaction information and confirmation records between transaction processor 14 and the loan servicer's bank 22.

The loan or debt servicer's bank 22 is connected with ACH network 20 through communications means 33 and is connected to the loan or debt servicer 24 through a suitable communications medium 35, which be any of an electronic, telephonic, or postal interconnection. 3rd party loan payment facilitator 26 and loan or debt servicer 24 are also connected with each other through communications path 37, which is not necessarily a permanent connection, but rather may be periodically established "on-demand" when data communication is required.

In accordance with the present invention, 3rd party loan payment facilitator 26 and the loan servicer 24 cooperate with each other and with the ATM network 8 to allow a consumer to complete a loan payment using the ATM network 8, and more particularly, using an ATM network access device 15 (FIG. 1) at the ATM banking institution 16. 3rd party loan payment facilitator 26 makes loan account information available to the ATM network 8 through communications path 31. This information may be uploaded to transaction processor 14 in a bulk transfer on a periodic basis, such as once a day, or may be supplied to transaction processor 14 on a transaction-by-transaction basis. In a case where a bulk transfer is used, communications path 31 may be an intermittent link, such as a dial-up modem connection, that is periodically established when it is necessary to transfer data to transaction processor 14. Conversely, when a transaction-by-transaction transfer is used, communications path 31 must be substantially permanent since transaction processor 14 will request such information any time a consumer initiates an ATM transaction.

Communications path 31 is also used to transfer information from transaction processor 14 to 3rd party loan payment facilitator 26. For example, 3rd party loan payment facilitator 26 will receive information from transaction processor 14 indicating that a user has completed a payment on an outstanding debt obligation. In this manner, the records maintained by the 3rd party loan payment facilitator can be updated, if desired, to reflect that such payment has been made. As described in more detail below, this information is also communicated to loan servicer 24 to assist, among other things, with updating loan records and investor reporting records, and with the settlement verification process occurring between loan servicer 24 and the loan servicer's bank 22.

3rd party loan payment facilitator 26 and loan servicer 24 are connected and communicate through a communications path 37, which may be any suitable data communications path, such as a dial-up modem connection, leased line, or TCP/IP connection. 3rd party loan payment facilitator 26 receives loan account information from loan servicer 24. While a single communications path 37 and a single loan servicer 24 are shown in FIG. 2 for clarity, in practice the present invention will likely include any number of loan servicers and associated communications paths 37 connected therewith. In such case, 3rd party loan payment facilitator 26 will collect loan account information from each of the plurality of loan servicers 24 through the communications paths 37 and will process this information as discussed in detail below to generate suitable loan account information for transfer to transaction processor 14 through communications path 31.

As mentioned above, loan servicer 24 also receives payment transaction records from the 3rd party loan payment facilitator 26 through communications path 37. In this manner, loan servicer 24 is notified that a payment has been made and that it can expect to receive a verification of such payment from the loan servicer's bank 22 in due course.

In a manner similar to the ATM banking institution shown in FIG. 1, the loan servicer's bank 22 is connected with the ACH network 20 of the ATM network 8 and receives electronic loan payment credits from the ACH network 20 through communications means 33. In accordance with one important feature of the present invention, ACH network 20 may initiate multiple electronic credits 33a, 33b, 33c using communication means 33. That is, where it is desirable that a loan payment be segregated and deposited to multiple accounts, ACH network 20 will initiate multiple funds transfers 33a, 33b, 33c, etc., to each of the respective accounts in an appropriate amount. In this manner, the burden on loan servicer 24 to segregate funds received from a consumer is eliminated while segregation required by investors is maintained.

Figure 3:
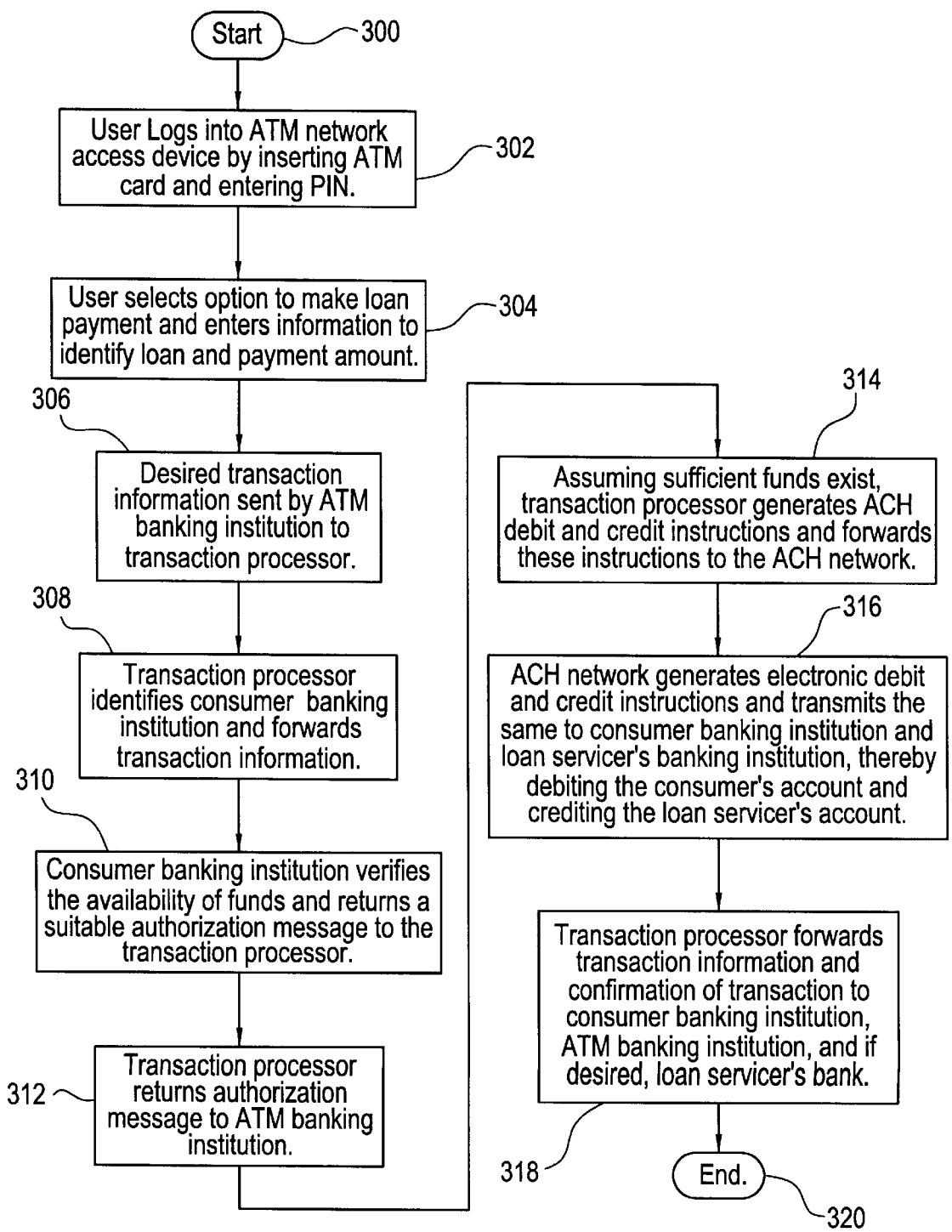
FIG. 3 is a flowchart illustrating the process of a debt obligation payment using a system of the present invention as shown in FIG. 2.

The process followed by a consumer to make a loan payment will now be described in more detail in connection with FIG. 3. The loan payment process shown in FIG. 3 illustrates the transactions performed by the ATM network 8 (FIGS. 1 and 2) in response to a user request that a loan payment be made, and funds transferred from the consumer's banking institution 18 to a loan servicer's bank 22. FIG. 3 does not illustrate the process by which information about a consumer's loans are retrieved from the loan servicer 24 and made available to the ATM network 8 to facilitate payment of these obligations. These features of the present invention are discussed in more detail below in connection with FIGS. 4–7.

Referring now to FIGS. 2 and 3, the process starts in block 300. In block 302 a user initiates an ATM session by inserting his ATM card and entering an appropriate PIN into an ATM network access device, such as an ATM terminal. Once the user has successfully logged into the ATM network, the user may elect to make a loan or debt payment in block 304. The user will be prompted to identify the loan for which he wishes to make a payment, and to indicate the amount of payment that he wishes to make. It should be noted that the user is not obligated to provide detailed information to identify the loan and the payment amount, but rather the user is provided with a series of display prompts that the user can select to make a payment on a debt obligation. Exemplary ATM screen displays and a flow diagram of such screens are provided as Appendix A attached hereto, illustrating the manner in which the present invention facilitates selection of a loan and entry of a payment amount.

In accordance with one feature of the present invention, the ATM network, and more particularly the ATM network access device, may automatically prompt the user to make a loan payment when one is due within a certain predetermined time frame. That is, if a user logs into an ATM terminal within a certain time period prior to a payment due date for a debt obligation, the ATM system may display a suitable reminder to the user that a loan payment is due, and offer the opportunity for that user to initiate a payment at that time. Therefore, it is to be understood that the following discussion of the loan payment process could be initiated by a user either himself, or in response to a prompt from the ATM network.

Also, in accordance with the present invention, a user is prohibited from making a payment for an amount less than that which is due on the debt obligation. That is, the user is prohibited from remitting a payment amount that is lower than that which is periodically due on the debt obligation, thus preventing confusion and misunderstanding that result when a consumer errantly pays some amount less than the full amount that is due under the obligation. The user may, however, elect to pay an amount greater than that which is due, with any overage applied to reduce the outstanding principal balance of the obligation.

Once the user has indicated the type of loan and the dollar amount of the payment to be made in block 304, the appropriate transaction information is sent from the ATM banking institution 16 to a suitable transaction processor 14 in block 306. In block 308, the transaction processor receives this information, identifies the appropriate consumer banking institution 18 associated with the user, and forwards appropriate transaction information to the consumer's banking institution 18.

The consumer's banking institution 18 uses this information to verify that sufficient funds are available in the user's account to satisfy the requested transaction in block 310. The consumer's banking institution 18 then generates an appropriate authorization message and returns it to transaction processor 14. In the event that sufficient funds are present for the transaction, the authorization message will indicate that the transaction should proceed. In the event that insufficient funds are present for the transaction, the authorization message will so indicate and the transaction will be halted with an appropriate message being displayed to the user at the ATM banking institution 16. In either event, transaction processor 14 forwards the authorization message back to the ATM banking institution 16 as shown in block 312.

In block 314, assuming that sufficient funds exist for the transaction to proceed, transaction processor 14 generates appropriate debit and credit instructions and forwards these instructions to the ACH network 20 in order to initiate the actual transfer of funds between the consumer's banking institution 18 and the loan servicer's bank 22. Specifically, the transaction processor 14 will request the ACH network to debit the consumer's account at the consumer's banking institution 18 by an amount equal to the debt payment amount indicated by the consumer, and will request that a credit be made to the appropriate loan servicer's account at the loan servicer's bank 22. One important feature of the present invention lies in the ability of the present invention to request that multiple credits be made to automatically segregate funds at the loan servicer's bank 22. By so doing, the effort of administration required by the loan servicer 24 is greatly reduced and substantial costs savings can be realized. In block 316, the ACH network will receive these fund transfer requests from the transaction processor and will generate and forward suitable debit and credit transaction requests to the appropriate banking institutions.

In block 318, the transaction processor 14 will generate suitable confirmations that the transaction has been completed and will forward confirmation records of such completion to the consumer's banking institution 18, to the ATM banking institution 16, and to the 3rd party loan payment facilitator 26. Transaction processor 14 can also forward a confirmation record of such completion to the loan servicer's bank 22 using optional communications path 32 as desired. With confirmation that the transaction has been successfully completed, a notice to that effect is displayed to the consumer and the process ends in block 320. The above debt payment transaction process described in connection with FIG. 3 assumes that debt information is available to the ATM network 8 for use in processing a consumer's request for a debt payment transaction. However, the currently known ATM system does not include such information and it is an object of the present invention to provide a system and method for making this information available to the ATM network 8 to facilitate the payment of debt obligations in the manner described above in connection with FIG. 3.

In accordance with the present invention, means are provided with both the 3rd party loan payment facilitator 26 and the loan servicer 24 to obtain the necessary information for use by the ATM network 8 in processing a consumer's debt payment request. In the most preferred embodiment, these means include software operating on a suitable computing device at both the 3rd party loan payment facilitator's 26 location and at the loan servicer's 24 location. This software operates to provide communication between the 3rd party loan payment facilitator 26 and the loan servicer 24, as well as appropriate communication with ATM network 8 using communications paths 31 and 37 shown in FIG. 2.

The software residing at the loan servicer's 24 location interfaces with communication path 37 to transfer information between loan servicer 24 and 3rd party loan payment facilitator 26. During installation of this software, various information is input by the loan servicer 24 to facilitate this communication, including identification of the loan servicer's 24 type of modem and dial-in number for modem communications, operating environment, database design, systems platform, and contact information at the loan servicer's 24 place of business, etc.

Figure 4:
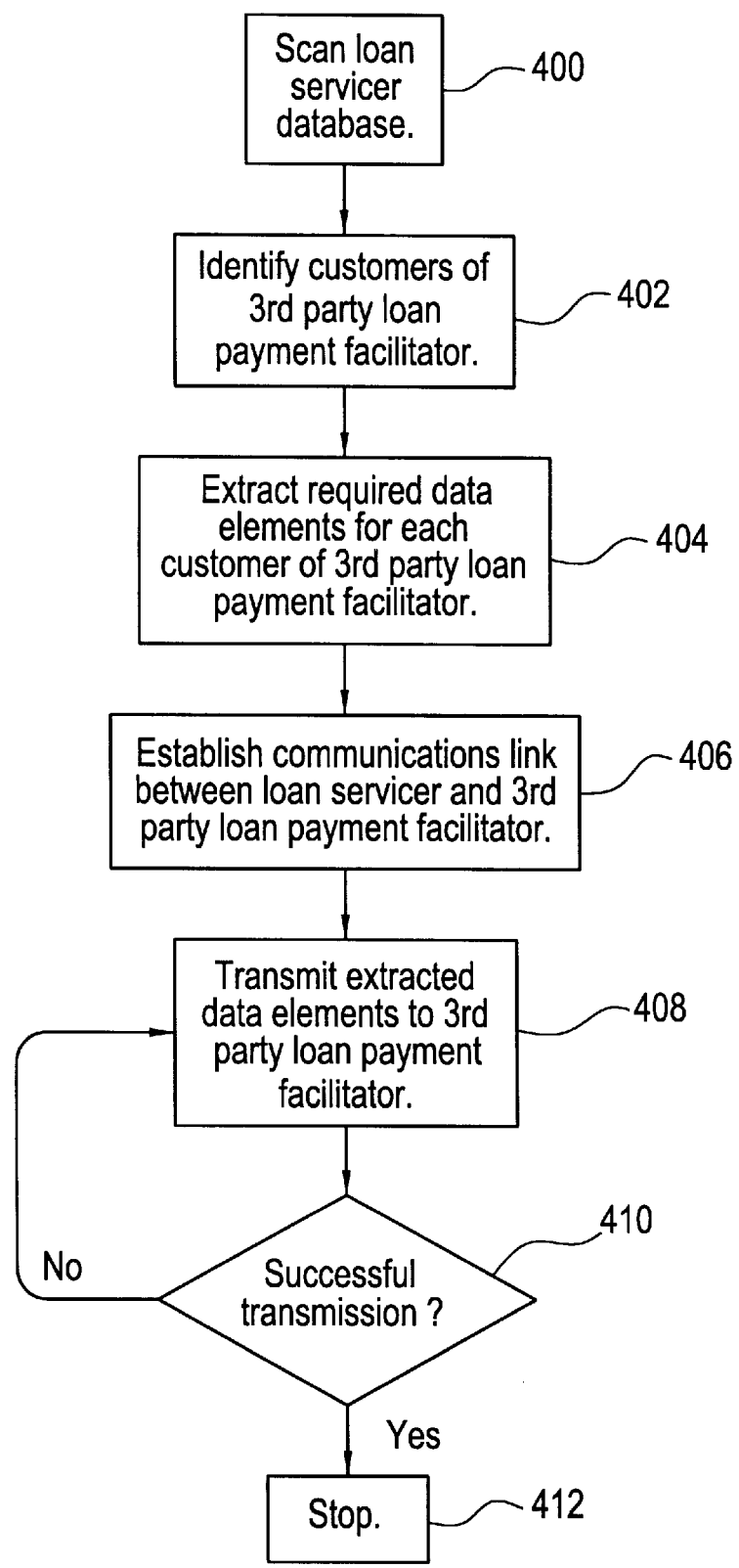
FIG. 4 is a flowchart of a process used by a loan servicer to retrieve and process information for forwarding to a 3rd party loan payment facilitator.

As illustrated in FIG. 4 in block 400, the software scans the database of loan servicer 24 and in block 402 identifies customers electing to use the services of 3rd party loan payment facilitator 26. For example, the database of loan servicer 24 could include a field having information identifying that customer as one electing to use the services of the 3rd party loan payment facilitator 26. When a customer is located, the software extracts the necessary data elements from the record and preferably stores this information in a temporary file in block 404. The scanning process then continues in this manner until it has completed scanning the entire database of loan servicer 24.

Exemplary data extracted from the loan servicer's 24 database is shown in Table I below. Of course, more or less information may be extracted and forwarded to 3rd party loan payment facilitator 26 as desired.

TABLE I

ACCOUNT DATA RECEIVED FROM LOAN SERVICERS

| Data Element | Description |
| --- | --- |
| Servicer Identification Number | Means by which 3rd party loan payment facilitator uniquely identifies its customers |
| Site Identification Number | Means by which 3rd party loan payment facilitator identifies sub-components of its customers |
| Servicer Name | Servicer Name |
| Servicer Mailing Street Address | Servicer Mailing Street Address |
| Servicer Mailing City | Servicer Mailing City |
| Servicer Mailing State | Servicer Mailing State |
| Servicer Mailing Zip Code | Servicer Mailing Zip Code |
| Servicer Mailing Zip + 4 | Servicer Mailing Zip + 4 |
| Servicer Contact | Servicer Contact |
| Servicer Contact Phone | Servicer Contact Phone |
| Servicer Contact Fax | Servicer Contact Fax |
| Site Mailing Street Address | Site Mailing Street Address |
| Site Mailing State | Site Mailing State |
| Site Mailing Zip Code | Site Mailing Zip Code |
| Site Mailing Zip + 4 | Site Mailing Zip + 4 |
| Site Contact | Site Contact |
| Site Contact Phone | Site Contact Phone |
| Site Contact Fax | Site Contact Fax |
| Borrower First Name | Borrower First Name |
| Borrower Middle Initial | Borrower Middle Initial |
| Borrower Last Name | Borrower Last Name |
| Borrower Social Security Number | Borrower Social Security Number |
| Co-borrower First Name | Co-borrower First Name |
| Co-borrower Middle Initial | Co-borrower Middle Initial |
| Co-borrower Last Name | Co-borrower Last Name |
| Co-borrower Social Security Number | Co-borrower Social Security Number |
| Borrower Mailing Street Address | Borrower Mailing Street Address |
| Borrower Mailing City | Borrower Mailing City |
| Borrower Mailing State | Borrower Mailing State |
| Borrower Mailing Zip Code | Borrower Mailing Zip Code |
| Borrower Mailing Zip + 4 | Borrower Mailing Zip + 4 |
| Property Mailing Address | Location of the property securing the mortgage loan |
| Property Mailing City | Property Mailing City |
| Property Mailing State | Property Mailing State |
| Property Mailing Zip Code | Property Mailing Zip Code |
| Property Mailing Zip + 4 | Property Mailing Zip + 4 |
| Loan Number | Servicer's unique loan identifier |
| Original Loan Balance | Original dollar amount of the loan |
| Outstanding Unpaid Principal Balance | Current amount owed by the borrower on the loan |
| Outstanding Escrow Reserve Balance | Current amount paid by the borrower and held in escrow reserve by the servicer for the future payment of real estate taxes, insurance, etc. |
| Principal Paid YTD | YTD principal amount paid by the borrower |
| Interest Paid YTD | YTD interest amount paid by the borrower |
| Tax Paid YTD | YTD local property taxes paid by the borrower and collected and managed by the servicer, if any |
| Insurance Paid YTD | YTD home owners insurance paid by the borrower and collected and managed by the servicer, if any |
| MI Premium Paid YTD | YTD mortgage insurance premium paid by the borrower and collected and managed by the servicer, if any |
| Current Loan Interest Rate | Current Loan Interest Rate |
| Loan Type Indicator | Identifies Loan as Fixed Rate or Adjustable Rate |
| Current Principal Owed | Amount of payment due that will be applied to reduce the principal amount of the loan |
| Current Interest Owed | Amount of payment due that will be applied to the interest of the loan |
| Current Escrow Tax Owed | Amount of payment that will be applied to local property taxes managed by servicer, if any |
| Current Escrow Insurance Owed | Amount of payment due that will be applied to pay premium on home owners insurance managed by servicer, if any |
| Current MI Premium Owed | Amount of payment due that will be used to pay premium for primary mortgage insurance, if any |
| Current Payment Owed | Total payment amount due to satisfy mortgage terms |
| Current Servicing Fee (Percent) | Percentage Amount of the Outstanding Unpaid Principal Amount withheld by the servicer from the Current Interest Owed as compensation for performing the loan servicing function |
| Current Servicing Fee (Dollars) | Dollar Amount of the Current Interest Owed withheld by the servicer as compensation for performing the loan servicing function |
| Date Current Payment Due | Date by which payment must be received to satisfy mortgage terms |
| Late Fee Due | Date on which late fees/penalties will be added to the Current Payment Owed if payment has not been received by the servicer |
| Date of Last Paid Installment | Date last payment was made which satisfied mortgage terms |
| Penalties/Fees Owed | Penalties or fees owed, in addition to the Current Payment Owed |
| P&I Routing Number | ACH routing number (identifier) of bank at which principal and interest portion of payment is deposited |
| P&I Account Number | Account number into which P&I portion of payment is deposited |
| T&I Routing Number | ACH routing number (identifier) of bank at which property tax and homeowners insurance premium portion of payment is deposited |
| T&I Account Number | Account number into which T&I portion of payment is deposited |
| MIP Routing Number | ACH routing number (identifier) of bank at which mortgage insurance premium portion of payment is deposited |
| MIP Account Number | Account number into which MI payment is deposited |
| Fee Routing Number | ACH routing number (identifier) of bank at which fees and penalties portion of payment (including servicing fee) is deposited |
| Fee Account Number | Account number into which fees and penalties portion of payment (including servicing fee) is deposited |
| Investor Identification | Secondary Market Owner of mortgage (if any) |
| Investor Loan Number | Investor's unique loan identifier |
| Investor Remittance Type | Investor loan classification which identifies how the investor is to be paid the current principal and interest owed on the loan |

In accordance with the most preferred embodiment of the present invention, the extracting software is executed at least once each day between 4 and 6 pm U.S. Eastern Standard Time. The software should automatically initiate and complete the database scanning process based on time parameters provided by loan servicer 24. Where automatic execution is not possible, the software prompts a user as a reminder that the database scan needs to be executed and informs the user as to how long it has been since the last update was processed.

Once the appropriate data elements are extracted from loan servicer's 24 database, the software establishes in block 406 a communications link between the loan servicer 24 and the 3rd party loan payment facilitator 26 and transmits this data to the 3rd party loan payment facilitator 26 in block 408. While in this embodiment communications are initiated by the loan servicer 24, it will be apparent to those of skill in the art that it is possible, and in fact may be preferable, for 3rd party loan payment facilitator 26 to initiate data communications with the loan servicer 24. Any suitable communications path can be used, including a dial-up modem connection, leased line, TCP/IP or world wide computer network interconnection. In block 410, the software verifies that the data has been accurately transmitted and retries the transmission if a failure occurs. Upon successful transmission, the process ends in block 412.

As noted above, the system and method of the present invention will likely interact with any number of loan servicers, or with geographically dispersed operations centers of large loan servicers. Therefore, the above data extraction process is performed for any and all loan servicers or operations centers having information that must be communicated to the 3rd party loan payment facilitator 26.

Figure 5:
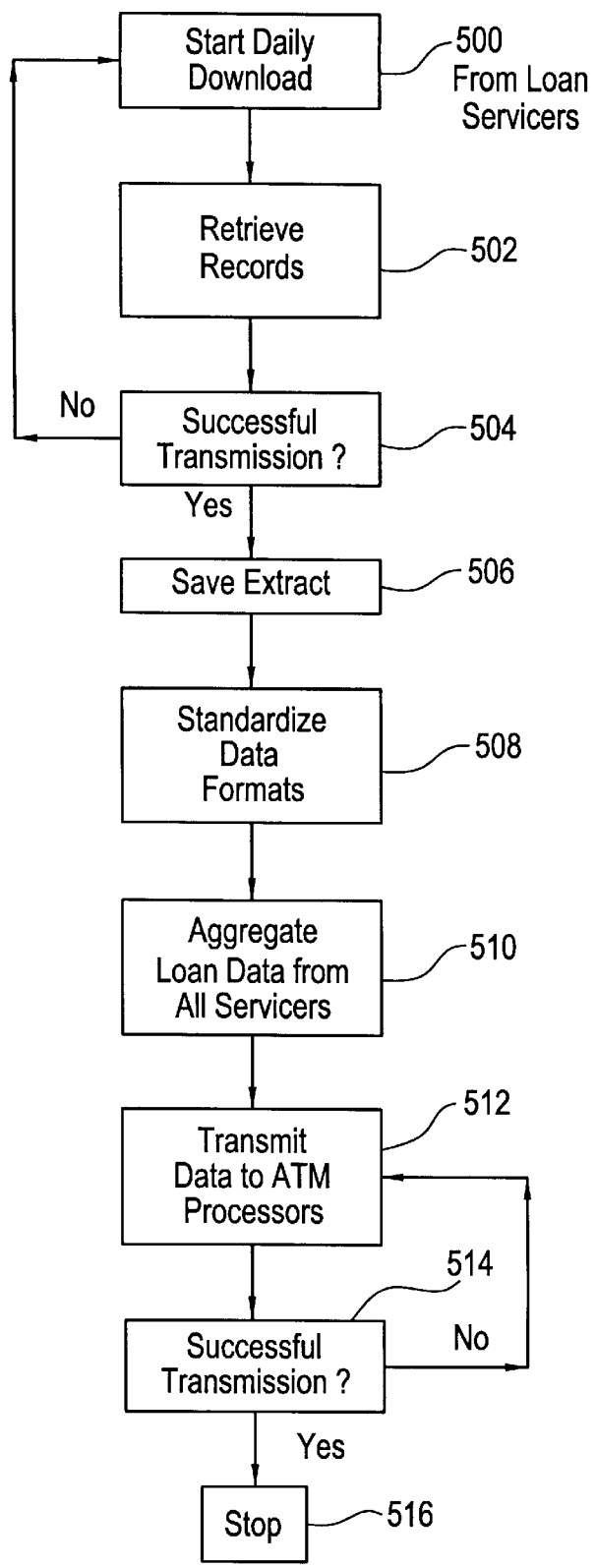
FIG. 5 is a flowchart of a process used by a third party loan payment facilitator to extract and process debt obligation data from one or more loan servicers in accordance with the present invention.

The data from each of the loan servicers 24 is received by 3rd party loan payment facilitator 26 using appropriate communications and processing software, which is illustrated in flow chart form in FIG. 5. This software is capable of receiving data from a plurality of loan servicers or operations centers. A log of records received from each loan servicer is also generated and stored with the 3rd party loan payment facilitator 26. As seen in FIG. 5, the process begins with the initiation of a daily download in block 500. The software retrieves from the loan servicer 24 the required data elements extracted from the loan servicer's records (FIG. 4, block 404) in block 502. If the transmission fails in block 504, control returns to block 500 and the download session is repeated. Upon a successful transmission, the extracted data is saved in block 506 and converted to an appropriate format in block 508 for storage in a database at the third party loan payment facilitator's 26 location. The data may also be saved to a back-up log for subsequent recovery or verification purposes. The data formatting used by each of the loan servicers 24 may or may not correspond to each other and to the format used by 3rd party loan payment facilitator 26. Therefore, when an incompatible data format is used, the 3rd party loan payment facilitator 26 first converts the information into a format compatible with the third party loan payment facilitator's 26 database system.

Once the software receives, converts and stores data from all loan servicers 24 or from all operations centers of geographically dispersed loan servicers, the data is converted and aggregated into a suitable format for communication to ATM network 8 (FIG. 2) as shown in block 510. In the most preferred embodiment of the present invention, the data is converted to an ANSI X.9, ANSI X.12, or ISO 8583 format, which are commonly used for ATM network data. While the above process is the preferred method in accordance with the present invention of receiving and processing the debt related information, it is to be understood by those of skill in the art that the data retrieval, formatting, and storage can be modified as desired. The primary objective achieved by the present invention is the retrieval of information of one or more loan servicers and the conversion of this information into a form that can be readily processed by an ATM transaction network to permit a user of the ATM network to view this data or to initiate a transaction in response to this data.

This data is then communicated in block 512 to ATM network 8 through a communication path 31, for example. In accordance with the present invention, the totality of this data can be downloaded to transaction processor 14 so that it is readily available when a consumer initiates a debt payment transaction using ATM network 8, or it may be stored in a database at the 3rd party loan payment facilitator's 26 location and single data records can be transferred to the ATM network 8 as required in response to a request from the transaction processor 14. This data is then used by the transaction processor 14 in the fashion described above in connection with FIGS. 2 and 3 to process debt payment requests initiated by a consumer. If the data is found to be successfully transmitted to the transaction processor 14 in block 514, the process terminates in block 516. If a transmission error is determined in block 514, then the process returns to block 512 and the data is retransmitted to the ATM processors until a successful transmission is achieved.

Figure 6:
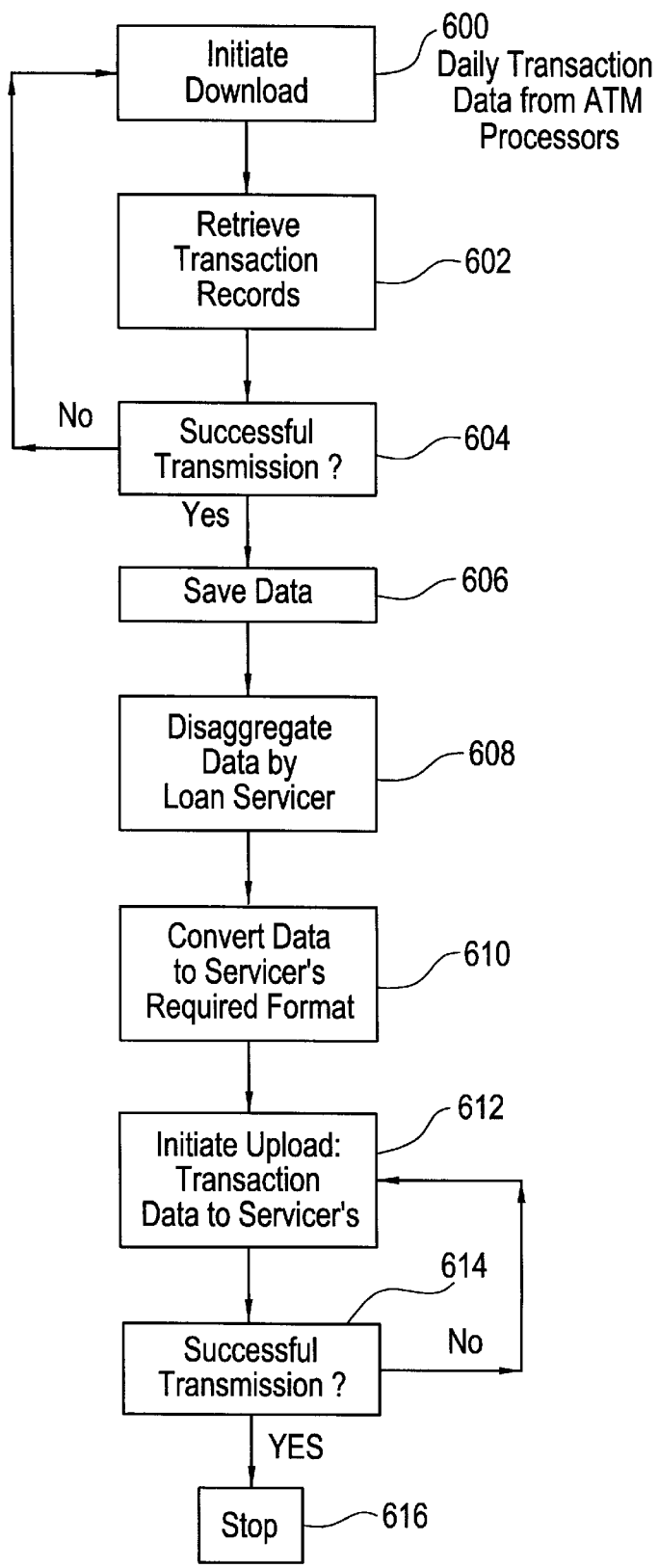
FIG. 6 is a flowchart of a process used by a third party loan payment facilitator to receive and process transaction information from an ATM transactions processor in accordance with the present invention.

The 3rd party loan payment facilitator 26 software further operates to receive a record of each debt payment transaction processed by the transaction processor 14, either on a transaction-by-transaction basis or in bulk form at the end of each business day. A flowchart of this portion of the software is shown in FIG. 6. The process begins in block 600 with the initiation of a download process. The software receives information for all successfully completed transactions in block 602. Table II includes an example of the data that is received in accordance with the present invention from transaction processor 14.

TABLE II

TRANSACTION DATA RECEIVED FROM PROCESSOR

| Data Element | Description |
| --- | --- |
| Date Payment Received | Date Payment Received |
| Total Amount of Payment | Total Amount of Payment |
| Servicer Identification Number | Means by which 3rd party loan payment facilitator uniquely identifies its customers |
| Site Identification Number | Means by which 3rd party loan payment facilitator identifies sub-components of its customers |
| Loan Identifier | Servicer's unique loan identifier/Loan Number associated with payment |
| P&I Routing Number | ACH routing number to which P&I portion of payment was sent |
| P&I Account Number | Account number to which P&I portion of payment was sent |
| P&I Deposit Amount | Amount of payment deposited to P&I account |
| T&I Routing Number | ACH routing number to which T&I portion of payment was sent |
| T&I Account Number | Account number to which T&I portion of payment was sent |
| T&I Deposit Amount | Amount of payment deposited to T&I Account |
| MIP Routing Number | ACH routing number to which MIP portion of payment was sent |
| MIP Account Number | Account number to which MIP portion of payment was sent |
| MIP Deposit Amount | Amount of payment deposited to MIP Account |
| Fees and Penalties Routing Number | ACH routing number to which fees and penalties portion of payment was sent |
| Fees and Penalties Account Number | Account number to which fees and penalties portion of payment was sent |
| Fees and Penalties Deposit Amount | Amount of payment deposited to fees and penalties account |

If the transmission fails in block 604, the process returns to block 600, where the download procedure is retried. Upon successful transmission of the data, the process proceeds to block 606, where the downloaded data is saved. In block 608, the transaction records are disaggregated by loan servicer. From this information, detailed records of the amount of funds transferred for each outstanding obligation are received and this information can be compared with the records received from the loan servicer 24 and appropriate entries made to indicate that certain debt obligations have been paid.

Next, in block 610, the 3rd party loan payment facilitator 26 software formats this information into a suitable form and forwards, in block 612, suitable information to the loan servicers 24 sufficient to identify the transactions completed for the given reporting period. In the event that no transactions have been processed for a particular loan servicer 24, this information is also forwarded to the loan servicer 24 to confirm that no transactions in fact occurred. If the transmission is found to be successful in block 614, then the process ends in block 616. Otherwise, control returns to block 612, where the transmission to the loan servicers 24 is retried.

Figure 7:
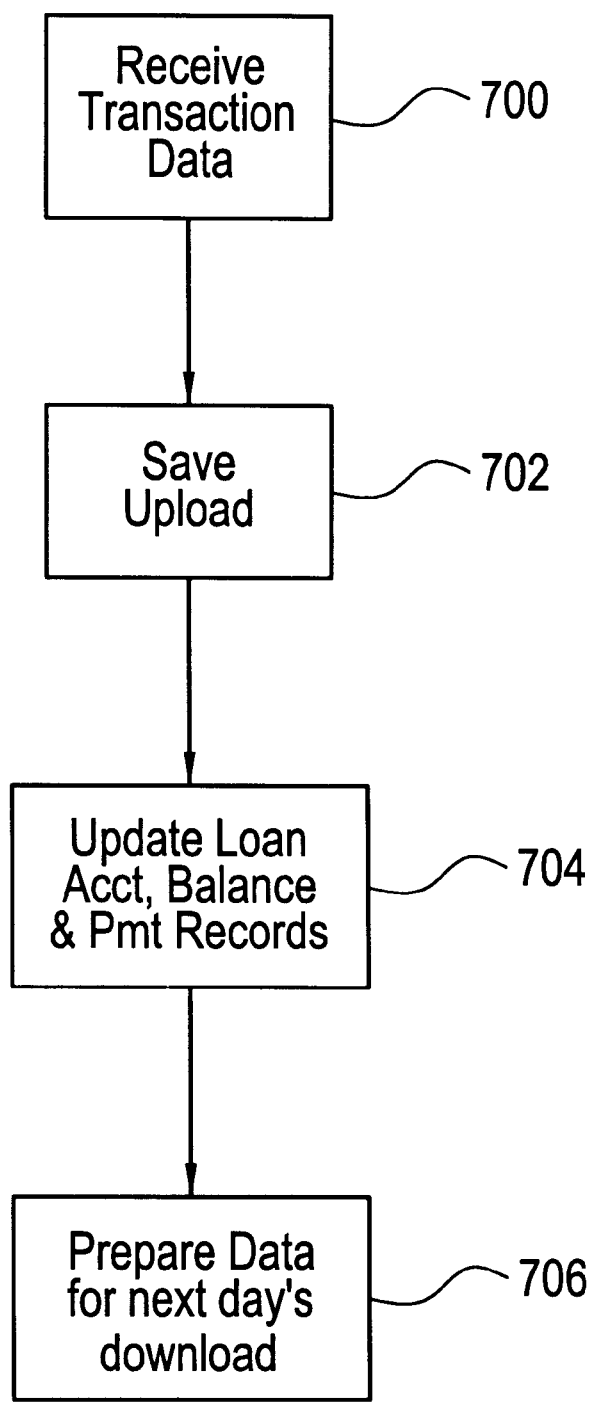
FIG. 7 is a flowchart of a process used by a loan servicer to receive and process transaction data from a 3rd party loan payment facilitator.

Referring to FIG. 7, upon receipt of this information in block 700, loan servicer 24 will save the information in block 702 and update its customer records in block 704 to reflect the payments processed by the ATM network 8, and will further use this information to aid in the settlement verification process and reconciliation of its bank accounts with loan servicer's bank 22. Furthermore, with this timely data, the loan servicers 24 can generate any necessary reports of transactions and current loan balances for forwarding to investors or secondary market agencies as required. Loan servicer 24 will then prepare the data for download the following day to the 3rd party loan payment facilitator in block 706.

In accordance with the present invention, appropriate modifications are made to the ATM network 8, and specifically to the ATM network access device, or ATM terminal, 15 shown in FIG. 1. A consumer electing to make a loan or debt payment or inquiry through an ATM selects an appropriate option from the ATM functional menu, after first having passed through the standard access requirements (i.e., inserting a magnetic-stripe ATM/debit card and entering an associated PIN). Once access has been gained, the consumer selects a payment option from the ATM functional menu, then selects the type of payment (i.e., mortgage, auto, home equity, credit card, other), elects to either make a payment or receive loan balance information only, and completes the transaction by responding to a series of prompts displayed on the ATM screens. If the user elects to receive loan balance information only, this information is retrieved as described above and provided to the user on a display portion of the ATM network access device or alternatively provided to the user in the form of a written receipt printed by the ATM network access device.

If payment is the option selected, the amount of the payment due and the name of the payee is displayed to the consumer for verification. The consumer is further given the option of paying additional funds to be applied to the loan principal balance, by keying the total dollar amount to be paid through the numeric key pad incorporated into all ATMs. In the most preferred embodiment, the invention will not allow the consumer to remit a payment amount less than the minimum payment due as displayed on-screen to the consumer. Once the consumer is satisfied that the amount to be remitted for loan payment is correct, the consumer elects to send the payment, again responding to a system prompt. If adequate funds are available in the consumer's transaction account to cover the amount of the payment, the consumer is given a receipt evidencing the transaction, and is returned to the ATM's main display screen for additional transactions. If sufficient funds are not available for the payment amount entered, the consumer is advised of the condition, the payment transaction is terminated, and the consumer is returned to the ATM's main display screen for additional transactions.

Although the invention has been described with reference to specific embodiments, various modifications of the disclosed embodiments as well as other embodiments of the invention will become apparent to persons skilled in the art on reference to the detailed description of the invention contained herein. Accordingly, the claims of the present application should not be limited to the specific preferred embodiments described.

We claim:

1. A method of processing a debt payment on a consumer debt obligation using an ATM network comprising the steps of:

communicating consumer debt obligation information for at least one consumer debt obligation from at least one debt servicer responsible for said at least one consumer debt obligation to a third party payment facilitator when a consumer has indicated to the at least one debt servicer that the consumer elects to use the third party payment facilitator to effect future payments over an ATM network;

storing said consumer debt obligation information in a computer database separate from said at least one debt servicer;

receiving command information with an ATM network access device from the consumer sufficient to identify the consumer debt obligation;

receiving command information with an ATM network access device from the consumer sufficient to identify the consumer debt obligation;

accessing said consumer debt obligation information to retrieve at least a portion of said consumer debt obligation information corresponding to said command information; and transmitting said portion of said consumer debt obligation information to a transaction processor associated with the ATM network to facilitate a transaction requesting that funds be transferred from an account associated with said consumer to at least one account at a banking institution associated with said at least one debt servicer whereby a payment on the consumer debt obligation is made;

wherein said funds transferred from said account associated with said consumer are divided into at least first and second portions prior to being transferred to said at least one account at said banking institution and are transferred to at least two different accounts at said banking institution.

2. The method of claim 1 further comprising the step of displaying a reminder to the consumer that a payment is due and wherein said command information received from the consumer is received in response to said reminder.

3. The method of claim 1 wherein said consumer debt obligation is a mortgage obligation and a first one of said at least two different accounts at said at least one banking institution receives funds including at least a principal portion of said mortgage obligation and a second one of said at least two different accounts at said at least one banking institution receives funds including an escrow portion of said mortgage obligation.

4. A method of processing a debt payment on a consumer debt obligation using an ATM network comprising the steps of:

communicating consumer debt obligation information for at least one consumer debt obligation from at least one debt servicer responsible for said at least one consumer debt obligation to a third party payment facilitator when a consumer has indicated to the at least one debt servicer that the consumer elects to use the third party payment facilitator to affect future payments over an ATM network;

storing said consumer debt obligation information in a computer database separate from said at least one debt servicer;

receiving command information with an ATM network access device from the consumer sufficient to identify the consumer debt obligation;

accessing said consumer debt obligation information to retrieve at least a portion of said consumer debt obligation information corresponding to said command information; and transmitting said portion of said consumer debt obligation information to a transaction processor associated with the ATM network to facilitate a transaction requesting that funds be transferred from an account associated with said consumer to at least one account at a banking institution associated with said at least one debt servicer whereby a payment on the consumer debt obligation is made;

wherein said transaction requesting that funds be transferred from an account associated with said consumer to said at least one account at said banking institution comprises at least two electronic credit requests.

5. A system for processing a debt payment on a consumer debt obligation using an ATM network comprising:

debt servicer access means for communicating consumer debt obligation information for at least one consumer debt obligation from at least one debt servicer responsible for said at least one consumer debt obligation to a third party payment facilitator when a consumer has indicated to the at least one debt servicer that the consumer elects to use the third party payment facilitator;

storage means connected with said debt servicer access means for storing said consumer debt obligation information in a computer database separate from said at least one debt servicer and associated with the third party facilitator;

ATM network access means connected with said storage means for transferring at least a portion of said consumer debt obligation information to an ATM network;

input means for receiving commands using an ATM network access device from a user identifying the consumer debt obligation;

database accessing means connected with said input means and said ATM network access means for accessing said computer database in response to said commands to retrieve at least a portion of said consumer debt obligation information from said database; and transmission means connected with said data base accessing means for transmitting said portion of said consumer debt obligation information to a transaction processor associated with the ATM network to facilitate a transaction requesting that funds be transferred from an account associated with said consumer to an account at a banking institution associated with said at least one debt servicer;

wherein said funds transferred from said account associated with said consumer to said at least one banking institution are divided into at least a first and second portion prior to being transferred to said banking institution and are transferred to at least two different accounts at said banking institution.

6. The system of claim 5 further comprising display means for displaying a reminder to the consumer that a payment is due and wherein said commands received from the consumer are received in response to said reminder.

7. The system of claim 5 wherein said consumer debt obligation is a mortgage obligation and a first one of said at least two different accounts at said at least one banking institution receives funds including at least a principal portion of said mortgage obligation and a second one of said at least two different accounts at said at least one banking institution receives funds including an escrow portion of said mortgage obligation.

8. A method of electronically making a payment on one consumer debt obligation of a consumer using an ATM network comprising the steps of communicating data relating to said one consumer debt obligation from a debt servicer responsible for the consumer debt obligation to a third party payment facilitator, receiving input from said consumer directing a payment to be made on the consumer debt obligation in accordance with said data, dividing the payment into at least a first portion and a second portion prior to transferring funds from a consumer account associated with the consumer to an account at a banking institution associated with said debt servicer, and generating at least two electronic credits processed by said ATM network corresponding to said first portion and said second portion to transfer funds from said consumer account to at least two different accounts at said banking institution associated with said debt servicer.

9. The method of claim 8 wherein said consumer debt obligation is a mortgage obligation and a first one of said at least two different accounts at said banking institution receives funds including at least a principal portion of said mortgage obligation and a second one of said at least two different accounts at said banking institution receives funds including an escrow portion of said mortgage obligation.

* * * * *